United States Patent [19]

Polojärvi

[11] Patent Number: 5,000,645
[45] Date of Patent: Mar. 19, 1991

[54] APPARATUS FOR HANDLING CONTAINERS, LOAD PALLETS OR SIMILAR LOAD UNITS, AND STRUCTURE OF THE LOAD UNITS

[75] Inventor: Raimo J. Polojärvi, Peltosalmi, Finland

[73] Assignee: Orion-Yhtyma Oy Normet, Finland

[21] Appl. No.: 378,210

[22] PCT Filed: Nov. 11, 1988

[86] PCT No.: PCT/FI88/00182
§ 371 Date: Jun. 20, 1989
§ 102(e) Date: Jun. 20, 1989

[87] PCT Pub. No.: WO89/04265
PCT Pub. Date: May 18, 1989

[30] Foreign Application Priority Data

Nov. 13, 1987 [FI] Finland .................................. 875040

[51] Int. Cl.$^5$ .............................................. B60P 1/64
[52] U.S. Cl. ......................................... 414/471; 298/11; 414/483; 414/493; 414/495; 414/498
[58] Field of Search ............... 414/471, 477, 478, 480, 414/482, 483, 484, 485, 491, 495, 498, 499, 493; 298/11

[56] References Cited

U.S. PATENT DOCUMENTS

| 2,786,590 | 3/1957 | Edwards et al. | |
| 3,077,278 | 2/1963 | Alexander | 414/491 X |
| 3,138,276 | 6/1964 | Allen et al. | |
| 3,195,749 | 7/1965 | Dempster et al. | 414/491 |
| 3,272,546 | 9/1966 | Cooley | 414/484 X |
| 3,302,808 | 2/1967 | Herpich et al. | 414/491 |
| 3,526,331 | 9/1970 | Marshall et al. | 414/491 |
| 3,957,166 | 5/1976 | Durham | 414/491 X |
| 4,344,731 | 8/1982 | Visa | 414/471 |
| 4,456,720 | 6/1984 | Newhard | 414/478 |

FOREIGN PATENT DOCUMENTS 0188280 7/1986 European Pat. Off. .

Primary Examiner—Frank E. Werner
Assistant Examiner—Robert S. Katz
Attorney, Agent, or Firm—Steinberg & Raskin

[57] ABSTRACT

The invention concerns an apparatus (10) for handling containers, load pallets or similar load units comprising an auxiliary body (12) on which the container or similar load object can be disposed to be movable, the auxiliary body being turnable relative to a body or chassis (11). The apparatus comprises a coupler connected to the auxiliary body (12), by the aid of which coupler the container or equivalent can be moved higher on the auxiliary body and off of the auxiliary body. The coupler comprises a tilting cylinder (17) between the body or chassis (11) and the auxiliary body (12) and a lifting cylinder (16) between the body or chassis (11) and the auxiliary body (12), and an intermediate lever (13). The intermediate lever (13) is at one end with a pivot (21) turnably connected to the auxiliary body (12) and at the other end with a pivot (20) to the body (11). The apparatus comprises structure (14,15,19,18) on the auxiliary body (12) by the aid of which the container or equivalent can be moved up on the auxiliary body (12) and off the auxiliary body (12). According to the invention, loading of the container or equivalent or removal of the container or equivalent may take place on a level higher than the transporting height.

11 Claims, 5 Drawing Sheets

APPARATUS FOR HANDLING CONTAINERS, LOAD PALLETS OR SIMILAR LOAD UNITS, AND STRUCTURE OF THE LOAD UNITS

BACKGROUND OF THE INVENTION

The present invention concerns an apparatus for handling containers, load pallets or equivalent similar articles and the construction of a container, load pallet or equivalent article handled with the apparatus.

Numerous apparatus for handling containers and load pallets or other equivalent load units are known in the art in which the container or similar load unit has been disposed to move onto the chassis of the transport vehicle with the aid of separate cylinder apparatus and cam mechanisms. In such designs of the prior art, an auxiliary body is tiltable relative to the vehicle chassis with the aid of the cylinder apparatus, and the auxiliary body is provided with separate gripping means by means of which the container or similar load unit can be hoisted up on the auxiliary body. Removal of the load from the auxiliary body is similarly performable with the aid of separate power means or by the aid of gravity.

A drawback of prior art apparatuses that the load container cannot be lifted to a height greater than the transporting height. Moreover, in apparatus designs of the prior art the gripping cams are constantly prominent e.g. by effect of a spring. This mechanism imposes extra limitations on the handling of the goods container. Therefore when it is desired to load containers on top of each other, the vehicle has to be fitted with extra hoisting equipment. The use of fork lift trucks, for instance, to accomplish such stacking tasks is known in the art. Therefore when load pallets placed in storage are being unstacked, similar dismounting means have to be employed, and therefore the means which are known in the handling of conventional load pallets cannot be considered in problem solutions conforming to the state of art when pallets are being dismounted from stacks.

SUMMARY OF THE INVENTION

The object is a apparatus with which a container, pallet or equivalent unit can be handled in such manner that the unit can be lifted to a greater height than the transporting height. Such an apparatus also has an an object to in mines in narrow and low-ceilinged tunnels and heads of galleries. The aim is furthermore, specifically, an apparatus intended for transporting containers, pallets, tanks, working units or similar articles when in the transport in question transport systems based on fork lift trucks or the like are not suitable.

The handling apparatus of the invention is mainly characterized in that the means comprises a tilting cylinder between the body and the auxiliary body and a lifting cylinder between the body and the auxiliary body, and an intermediate lever pivoted at one end with a joint on the auxiliary body and at the other end with a joint on the body, and the apparatus comprising members on the auxiliary body by which the container or equivalent can be moved onto or off the auxiliary body, whereat with the apparatus loading of a container or equivalent or unloading of a container or similar object may take place on a level higher than the transporting height.

The load unit which is handled with the handling apparatus of the invention is mainly characterized in that the container, load pallet or similar load unit comprises a plurality of stop members, the cam lever of the handling means being placeable in alternative positions between different stop members.

The load can be moved from one point to another with the handling apparatus of the invention. Loading and unloading can be performed from a plurality of different levels, varying from ground level to a level which is considerably higher than the transporting level. This particular feature enables containers to be stacked within a wide height range, and it is possible in addition, with the means of the invention, to perform loading and unloading from/onto loading ramps which are greatly variable in height. The handling apparatus of the invention is moreover controllable by one man from the cab of the vehicle. All control manipulations that are required are performable from the driver's cab.

BRIEF DESCRIPTION OF THE DRAWINGS

The invention is described in the following, referring to certain advantageous embodiments of the invention, presented in the figures of the attached drawings, yet to which the invention is not meant to be exclusively confined.

DESCRIPTION OF THE PREFERRED EMBODIMENTS

Figure 1:
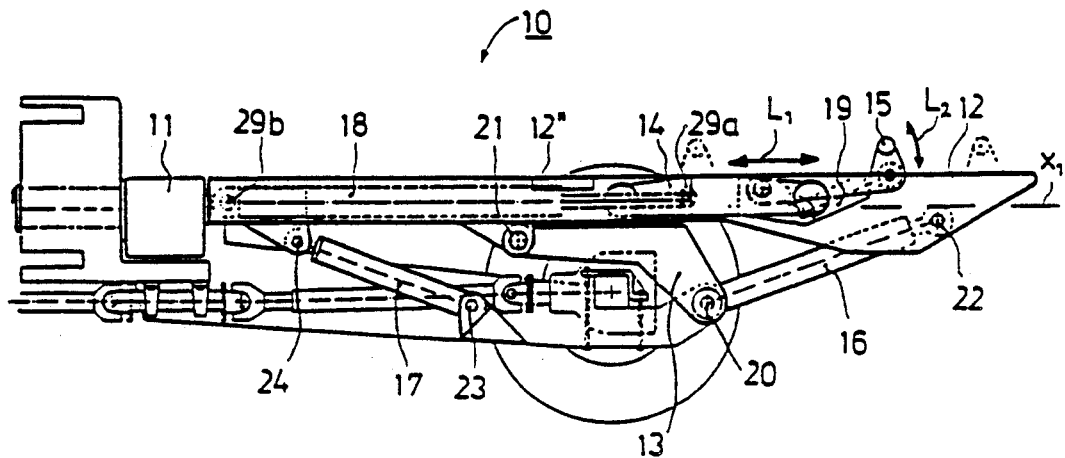
In FIG. 1 is presented the normal position of the handling apparatus, which is the transporting position. The projection is an elevational view of the apparatus.

In FIG. 1 is presented an apparatus according to the invention intended for handling containers, load pallets, tanks or equivalent load units. The handling apparatus 10 comprises a body 11, which may consist of a vehicle chassis, or of a separate body connected to the vehicle. With the auxiliary body is connected, in the central area, an intermediate lever 13. A slide 14 has been disposed to move in the direction of the longitudinal axis $X_1$ of the auxiliary body 12 as shown by arrow $L_1$. With the slide 14 is associated a cam lever 15 or equivalent. With the loading and unloading end of the auxiliary body 12 is associated a lifting cylinder 16. A tilting cylinder 17 is associated with the end of the auxiliary body 12 facing the forward part of the vehicle. A slide moving means 18 has been disposed in fixed connection with the auxiliary body 12, advantageously on the end thereof which faces the forward side of the vehicle. An element for turning the cam lever 15 has been indicated with reference numeral 19. The turning motion of the cam lever 15 is indicated by arrow $L_2$.

The intermediate lever 13 has been turnably attached to the body 11 with an articulated pivot joint 20 and to the auxiliary body 12, with an articulated pivot joint 21. The lifting cylinder 16 has been turnably attached to the body 11 with the pivot joint 20 and to the auxiliary body with an articulated pivot joint 22. The tilting cylinder 17 is turnably attached to the body with an articulated pivot joint 23 and to the auxiliary body 12 with a pivot joint 24. The moving means 18 is attached to the slide with an articulated pivot joint 29a and to the auxiliary body 12 with an articulated pivot joint 29b.

The handling means is seen in its normal position in FIG. 1, which is also the transporting position when the vehicle is being driven from one point to another. The auxiliary body 12 is in its lower position, and horizontal, in which case the lifting cylinders 16 and the tilting cylinder 17 are in their minimal position, that is, at their shortest lengths. In the foregoing, elevational views are shown of the handling means, whereby only one of the two lifting cylinders 16 and one of the two tilting cylinders 17 are depicted.

In the most advantageous embodiment of the invention, two lifting cylinders 15 are provided, on either side of the central axis of the vehicle and, similarly, there are two tilting cylinders 17, one on either side of the central axis of the vehicle. It is also obvious that such an embodiment of the invention is equally conceivable in which there is only one lifting cylinder and only one tilting cylinder, in which case these cylinders are disposed to be located on the central line of the vehicle and of the handling means.

Figure 2:
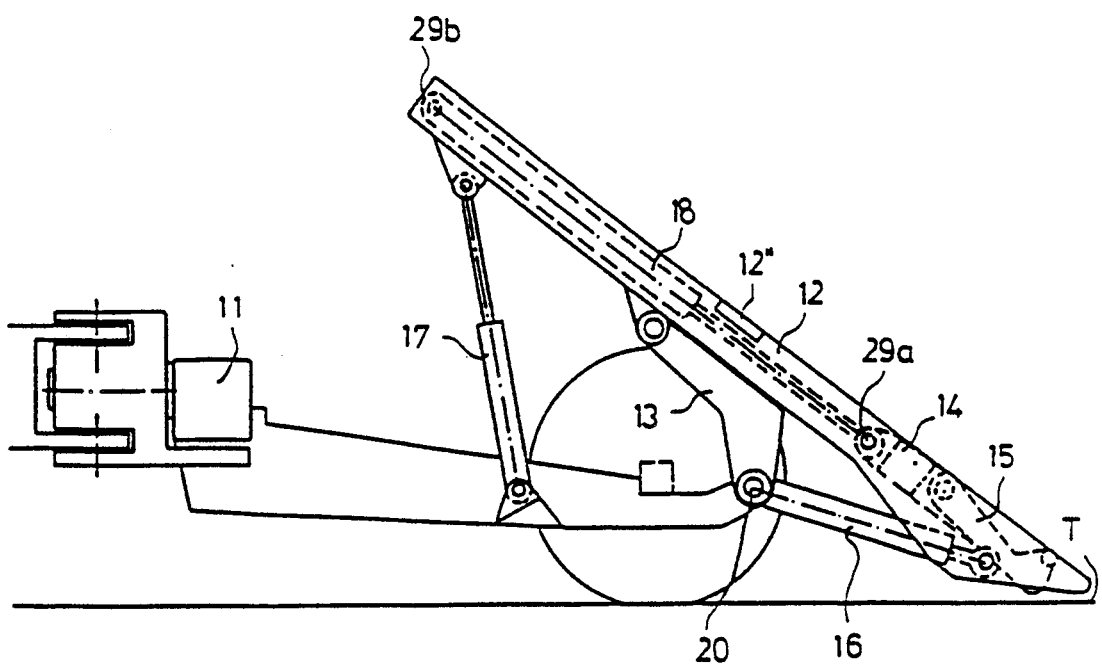
In FIG. 2 is depicted that position of the handling apparatus in which the container or similar load unit is gripped. This position also corresponds to the position in which the container or similar load unit is unloaded from the vehicle and deposited on the driving base.

In FIG. 2 that position of the handling means is depicted in which the tilting cylinder 17 has been extended to its maximum length and the lifting cylinder 16 is at its minimum length. In the loading and unloading position, depicted in FIG. 2, the auxiliary body 12 is positioned so that its central axis $X_1$ is substantially slanting, up to an angle of 45° against the horizontal plane T. In this position of the handling means 10 of the invention the slide 14 can be moved, by the aid of the actuating means 18, to the end position on the auxiliary body 12, in which then with the aid of the actuating means 19, advantageously an actuating cylinder, of the cam lever, which means (19) is associated with the slide 14, the cam lever 15 is turned so that it enters behind a stop member on the load unit, e.g. a load pallet. The slide 14 is thereafter with the moving cylinder 18 moved towards the end of the auxiliary body 12. Another working stroke may then be performed with the actuating means 18, thereby making the slide 14 with its cam 15 engage behind a new stop member, or serration, located farther rearward, and in this way it becomes possible to move the container or equivalent stepwise until it rests totally on the auxiliary body 12.

Figure 3A:
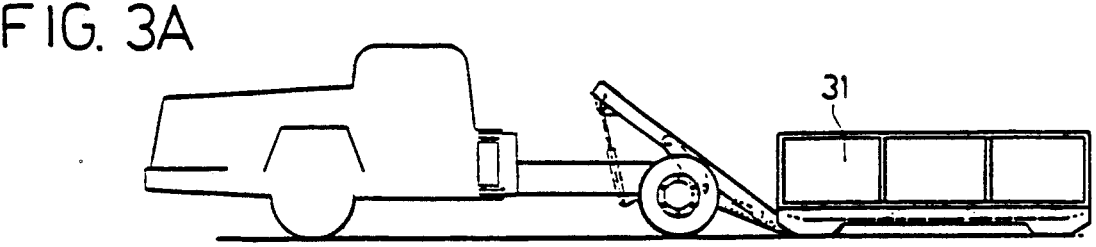
FIGS. 3A to 3E illustrate the loading of the container or similar unit, by its different steps. Unloading onto the driving base takes place in reverse order.

FIGS. 3A to 3E illustrate the different steps involved when a container or equivalent loading unit is lifted as taught by the invention. Loading a container, load pallet or the equivalent is accomplished as follows. As shown in FIG. 3A, the moving means 18, advantageously a moving cylinder, of the slide 14 is operated to move the slide 14 into its forward position. The moving cylinder 18 is then at its maximum length. The cam lever 15 pivoted to the slide 14 is lowered into its lower position by action of the actuating means 19, advantageously an actuating cylinder, of the cam lever 15. In this lower position the actuating cylinder 19 is at its minimum length. Next, the length of the tilting cylinders 17 is increased, and hereby the auxiliary body 12 begins to tilt about the pivot 20. When sufficient tilt has been reached, the front part of the auxiliary body 12 enters under the forward part of the container 31 when the vehicle is appropriately moved (FIG. 3A).

When the front part of the auxiliary body 12 has been inserted under the container 31, the tilting cylinders 17 are shortened, whereby the tilt of the auxiliary body 12 changes, its central axis $X_1$ turning toward the horizontal, about the pivot 20. This causes the front part of the auxiliary body 12 to lift the forward part of the container up. The lifting operation is continued until the auxiliary body 12 and the bottom of the container are in alignment.

Figure 3B:
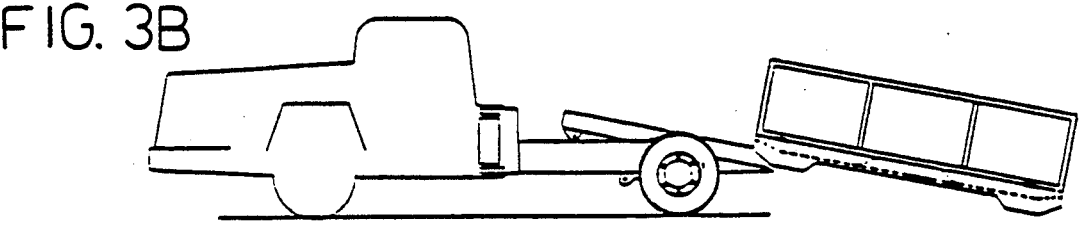

In FIG. 3B, the vehicle is being moved towards the container, at the same time keeping the auxiliary body 12 as well aligned with the bottom of the container 31 as possible.

Figure 3C:
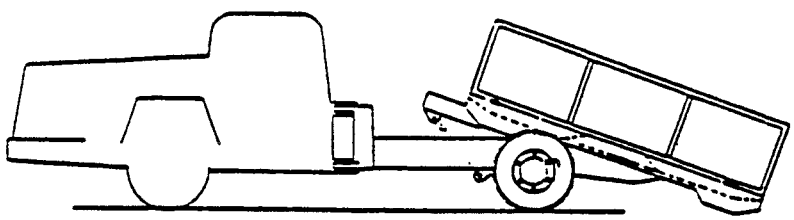
Figure 3D:
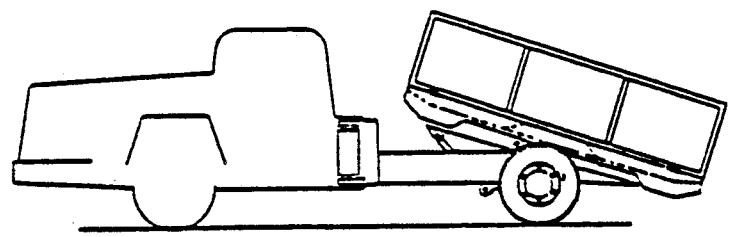
Figure 3E:
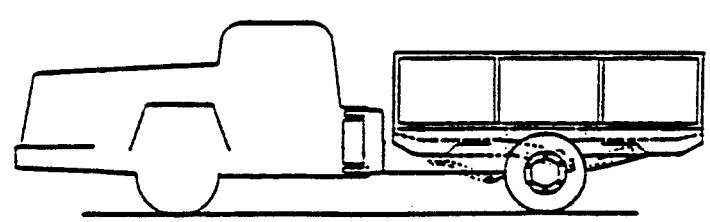

At the stage shown in FIG. 3C, the aid of the slide 14 is enlisted. The cam lever 15 is raised into its upper position, using the actuating means 19, advantageously a cylinder. The slide 14 is moved rearward using the moving means 18, advantageously a moving cylinder. When the cam lever 15 reaches the correct position relative to the container 31, it engages with the stop member, e.g. a serration, 32 on the bottom of the container 31 (in FIG. 7A). The container begins to move on the auxiliary body, moved by the slide 14, when the length of the moving cylinder 18 is reduced. If the container 31 does not move enough with one moving operation to become locked in position, another moving step, or so-called working stroke, is performed. This implies that the cam lever 15 is lowered, the slide 14 is once more moved forward, the cam lever 15 is raised, and the slide 14 is pulled back once more. FIG. 3D depicts the stage at which the container 31 has moved all the way into its locking gear. The auxiliary body 12 is thereafter lowered into transporting position, as shown in FIG. 3E. The locking members provided on the auxiliary body 12 prevent lateral movements of the container as well as those in the height direction. The cam lever 15 prevents longitudinal slipping of the container while the cam lever 15 is raised.

Unloading of the load unit is accomplished in that the auxiliary body 12 is tilted until the rear of the container 31 is level with the ground. The container 31 is thereafter pushed with the slide mechanism 14, whereby it comes free of its locking gear. Pushing of the container 31 is then continued, and the vehicle is at the same time moved out from under the container. The container 31, or equivalent load unit, is released from its engagement with the cam lever 15 by letting the cam lever 15 down from its locking position. The auxiliary body 12 is then tilted so that the container slides down to the ground by its own weight, as the vehicle is moved out from under. The sliding of the container may be assisted with the slide mechanism 14,15.

Figure 4:
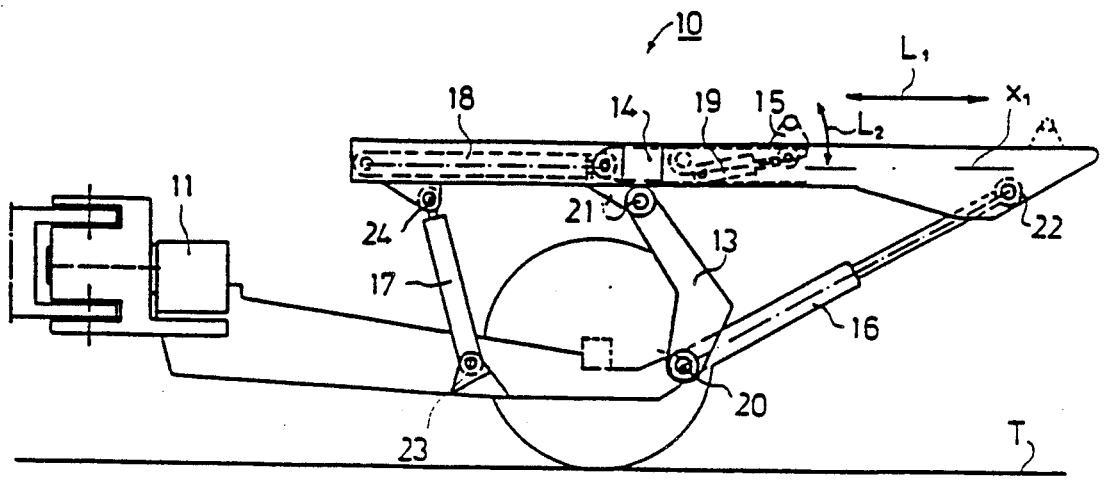
In FIG. 4 is depicted that position of the handling apparatus in which loading of the container, load pallet or equivalent onto the vehicle, or removal of said unit from the vehicle, may take place at a level higher than the transporting height.

In FIG. 4 is presented a position of the handling means in which the auxiliary body 12 of the handling means 10 has been lifted to the receiving or unloading height of a container or equivalent load unit by extending the lifting cylinder 16.

Figure 5A:
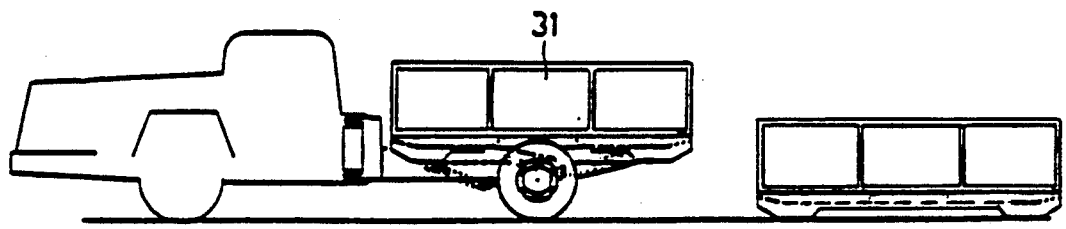
FIGS. 5A to 5D illustrate, in steps, the stacking of load pallets with the handling means of the invention.

FIGS. 5A to 5D illustrate the mode of removing a load unit 31 with the aid of the handling apparatus of the invention from the vehicle and delivering it on a level higher than the transporting height. FIGS. 5A to 5D illustrate the way in which load units 31, e.g. load pallets, are stacked. As shown in FIG. 5A. the load unit 31 is moved with the vehicle to the point where it is to be stacked.

Figure 5B:
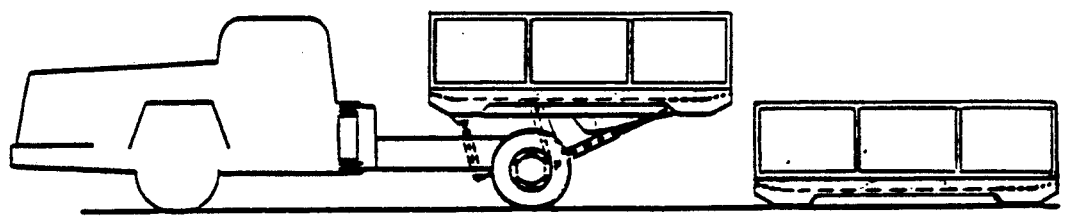

In FIG. 5B is depicted the stage at which the length of the lifting cylinder has been extended. The auxiliary body 12 has thereby been raised to a higher, horizontal position. As further shown in FIG. 5B, the vehicle is moved so that the front end of the lifting body enters as far as possible under the container or equivalent unit. The slide is then in its forward Position and the cam lever is in its lower position.

Figure 5C:
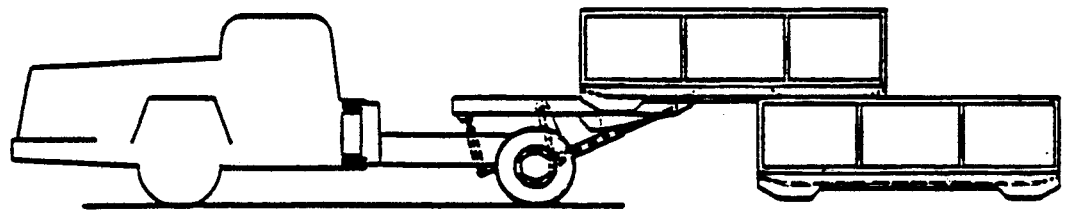
Figure 5D:
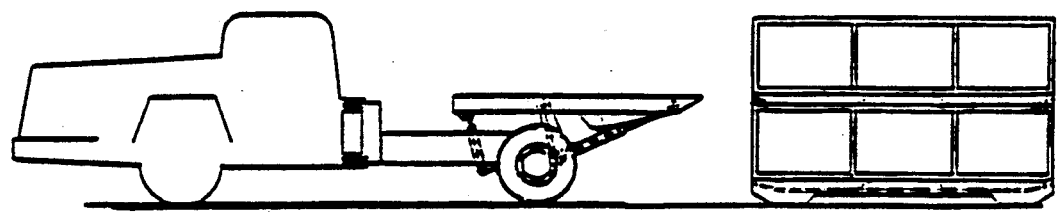

In FIG. 5C, the cam lever 15 is raised up, whereby it enters under a stop member 32', for instance the serration 32, provided on the load pallet 31 or other equivalent load unit. The slide 14 is then moved forward with the aid of the slide moving means, advantageously with the moving cylinder 18, whereby the container slides on the lifting body 12 to the removal level, e.g. upon another container or equivalent unit to be stacked. The slide mechanism 14,15 is operated to perform the required number of working strokes. The cam lever 15 is lowered, the slide 14 is retracted, the cam lever 15 is raised, and the slide 14 is again moved forward. As many working strokes are performed as are required until the load unit 31 is totally on its removal base. The auxiliary body is thereafter lowered back into transporting position.

Loading of containers or equivalent load units from a level higher than the transporting height of the vehicle is accomplished similarly as their removal from the vehicle, the succession of steps now being inverted.

Figure 6A:
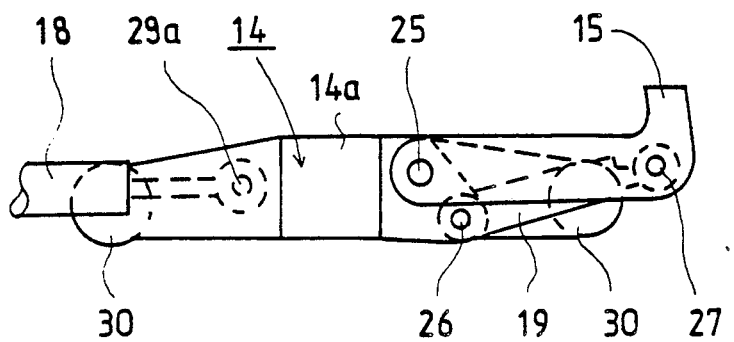
In FIG. 6A is presented, in elevational view, the structural design of the slide associated with the auxiliary body, and that of the cam lever associated with the slide.
Figure 6B:
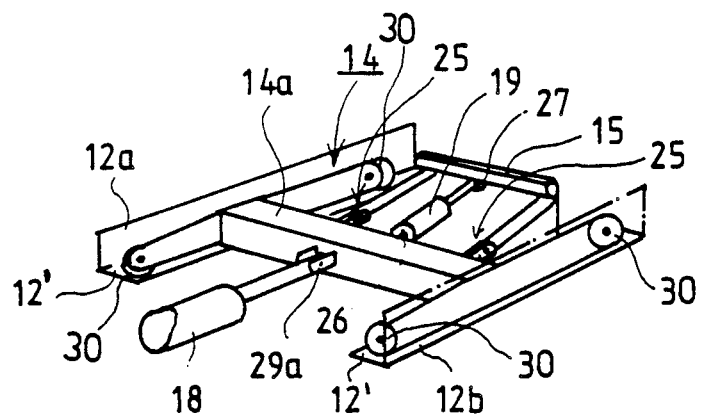
In FIG. 6B is presented, in axonometric principle diagram, the structural design of the slide.

In FIG. 6A, the structural design of the slide 14 of the invention is depicted in elevational view. FIG. 6B is a presentation of a design consistent with FIG. 6A, in partly schematic presentation.

The slide 14 comprises a body 14a. With the body 14a connects, by the pivot 29a, the piston rod of the actuating means 18, advantageously a hydraulic cylinder. The actuating means 18 is connected with the auxiliary body 12 by the pivot 29b. The cam 15 connects by the pivot 25 with the other end of the body 14a. The moving means 19 moving the cam lever 15, advantageously a cylinder, has been attached with the pivot 26 to the body 14a, and the piston rod of the cylinder has been connected with the cam lever 15 by the pivot 27. Guide rollers 30 have been mounted rotatably relative to the body 14a, and the number of such guide rollers is advantageously four; two on each end of the body 14a. The slide 14a has been disposed to move in the guides 12' of the beams 12a,12b provided on the auxiliary body 12, guided by the guide rollers 30. The slide 14 is moved with the aid of the moving cylinder 18.

Figure 7A:
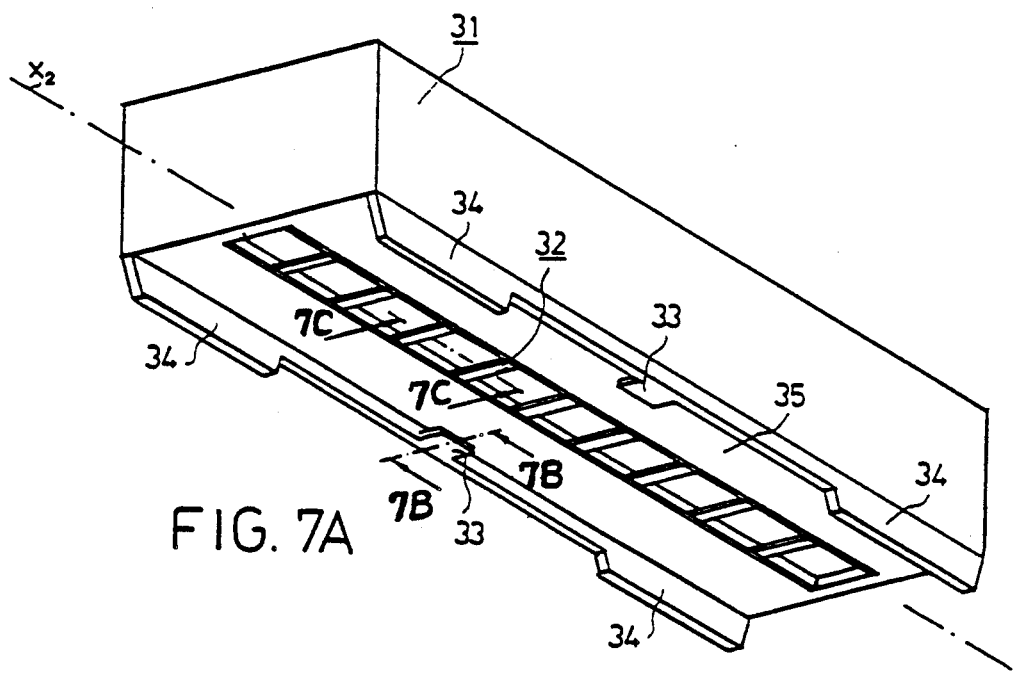
FIG. 7A shows the modifications of the load which the handling apparatus requires. This is an axonometric projection.

FIG. 7A presents the appurtenances on the container, load pallet or equivalent load unit 31 required by the present handling apparatus. In the central area of the load unit 31, adjacent to its bottom and on the sides, at least two locking strips 33 are provided; they meet the corresponding locking points 12" of the auxiliary body 12. The load unit also comprises strip-like lateral guides 34 on the ends of the unit. These lateral guides also serve as legs on which the load unit 31 can be deposited to stand. They serve as lateral guides when the bottom 35 of the unit 31 slides on the auxiliary body 12 upon the beams 12a,12b, and they prevent damage in adverse conditions to the stop member serration 32, provided centrally on the unit and parallel to the unit's longitudinal axis $X_2$.

Figure 7B:
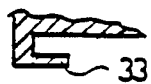
FIG. 7B shows, enlarged, the section A—A from FIG. 7A.

FIG. 7B shows, on an enlarged scale, the section A—A from FIG. 7A. The locking strip 33 enters under the locking edge 12" of the auxiliary body 12. Vertical displacement of the load unit 31 is hereby prevented.

Figure 7C:
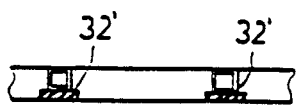
FIG. 7C shows, enlarged, the section I—I from FIG. 7A.

FIG. 7C shows the section I—I from FIG. 7A. The serration 32 is composed of a plurality of stop members 32' behind each of which the cam lever 15 may be placed.

I claim:

1. An apparatus mountable on a vehicle for handling load units, said apparatus comprising:
   a body (11) which is both connected to and stationary with respect to said vehicle;
   an auxiliary body (12) having a substantially planar loading surface on which one of said load units can be disposed so as to move relative thereto, said auxiliary body (12) being turnable relative to said body (11);
   a tilting cylinder (17);
   means (23) for connecting one end of said tilting cylinder to said body;
   means (24) for connecting the other end of said tilting cylinder to said auxiliary body;
   a lifting cylinder (16);
   means (27) for connecting said lifting cylinder to said auxiliary body;
   an intermediate lever (13);
   means (21) for connecting said intermediate lever to said auxiliary body;
   a first articulated pivot joint (20) which connects both said lifting cylinder (16) to said body (11) and said intermediate lever (13) to said body (11);
   a coupling means mounted on said auxiliary body (12) said coupling means functioning to move said load units into and out of contact with said auxiliary body; and
   wherein loading and unloading of one of said load units can take place with the entire loading surface at a greater height that the height of said loading surface when said said load units are transported on said vehicle, and this change in height is caused by actuation of said lifting and tilting cylinders.

2. The apparatus of claim 1, wherein said coupling means comprises a slide (14), a slide moving means (18) for moving said slide on said auxiliary body (12) in a direction parallel to the longitudinal axis of said auxiliary body and a cam lever (15) connected to said slide and capable of being brought into contact with a stop member of one of said load units mounted on said vehicle.

3. The apparatus of claim 1, wherein said means for connecting one end of said tilting cylinder to said body comprises a second articulated pivot joint (23), said means for connecting the other end of said tilting cylinder to said auxiliary body comprises a third articulated pivot joint (24), said means for connecting said lifting cylinder to said auxiliary body comprises a fourth articulated pivot joint (22), and said means for connecting said intermediate lever to said auxiliary body comprises a fifth articulated pivot joint (21).

4. The apparatus of claim 2, wherein said means for connecting one end of said tilting cylinder to said body comprises a second articulated pivot joint (23), said means for connecting the other end of said tilting cylinder to said auxiliary body comprises a third articulated pivot joint (24), said means for connecting said lifting cylinder to said auxiliary body comprises a fourth articulated pivot joint (22), and said means for connecting said intermediate lever to said auxiliary body comprises a fifth articulated pivot joint (21).

5. The apparatus of claim 2, wherein said coupling means further comprises a turning means (19) for turning said cam lever (15) whereby said cam lever can be brought into contact with said stop member.

6. The apparatus of claim 5, wherein said turning means comprises a cylinder.

7. The apparatus of claim 2, further comprising at least one guide roller (30) mounted to be rotatable relative to said slide (14) and functioning to contact said slide and move it in coordination with movement of said auxiliary body (12).

8. The apparatus of claim 7, wherein said auxiliary body comprises one or more guide tracks (12') along which said at least one guide roller (30) can be disposed to roll.

9. The apparatus of claim 2, wherein said cam lever (15) is movable to contact a plurality of stop members on one of said load units.

10. The apparatus of claim 1, whereby said load units comprise at least one locking strip (33), and said auxiliary body (12) comprises a locking border (12") under which said locking strip can be disposed such that said one load unit can be locked to be stationary relative to said auxiliary body when said one load unit has been loaded upon said auxiliary body.

11. The apparatus of claim 1, whereby said load units comprise a pair of lateral guides (34), and said auxiliary body (12) comprising a plurality of frame beams (12a, 12b), such that said frame beams can be disposed between said pair of lateral guides when said load unit contacts said auxiliary body on said vehicle.

* * * * *